R. NIELSEN.
ICE CREAM SPOON.
APPLICATION FILED MAR. 2, 1911.

1,052,370.

Patented Feb. 4, 1913.
2 SHEETS—SHEET 1.

Witnesses

Inventor
R. Nielsen.
By
Attorney

R. NIELSEN.
ICE CREAM SPOON.
APPLICATION FILED MAR. 2, 1911.
1,052,370.
Patented Feb. 4, 1913.
2 SHEETS—SHEET 2.
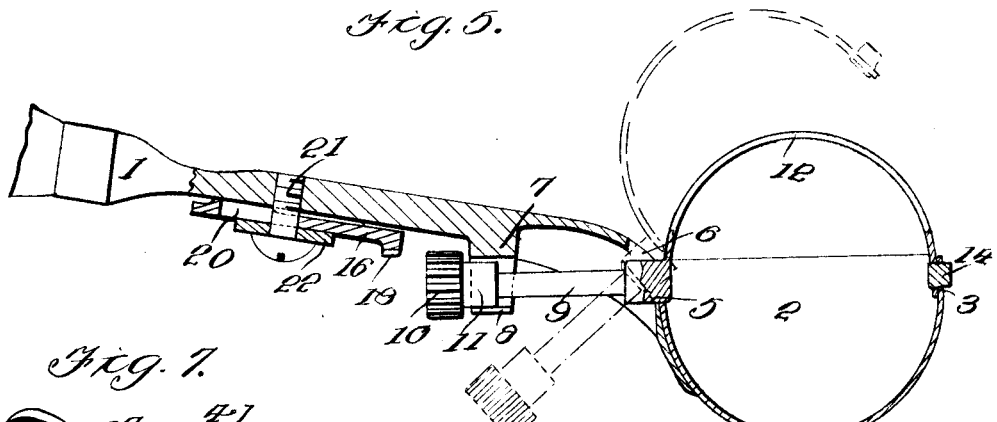
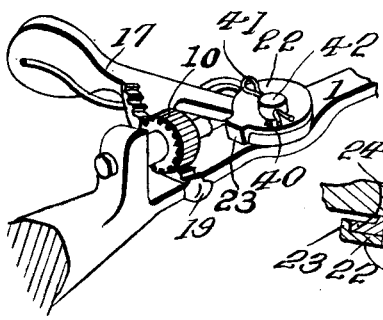
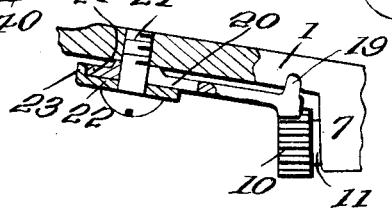
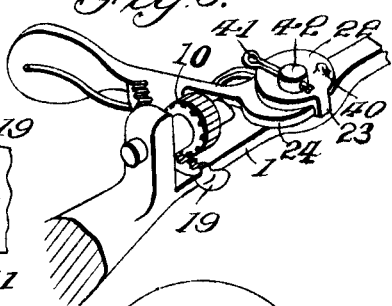
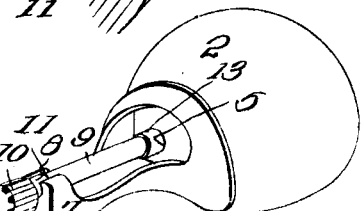
Witnesses
Floyd R. Cornwall.
J. Abraham
Inventor
R. Nielsen.
By
Attorney

UNITED STATES PATENT OFFICE.

RASMUS NIELSEN, OF TROY, NEW YORK.

ICE-CREAM SPOON.

1,052,370.

Specification of Letters Patent.   Patented Feb. 4, 1913.

Application filed March 2, 1911.   Serial No. 611,915.

*To all whom it may concern:*

Be it known that I, RASMUS NIELSEN, citizen of the United States, residing at Troy, in the county of Rensselaer and State of New York, have invented certain new and useful Improvements in Ice-Cream Spoons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in ice cream spoons.

The object of the invention is to permanently mount the means for operating the scraper on the handle, and arrange said means in such manner that it can be laterally displaced from normal position, without disconnecting it from said handle, whereby the scraper can be conveniently and quickly removed for cleaning, or repairs.

The invention also relates to the specific details of construction and arrangement of parts, which will be hereinafter described, and particularly pointed out in the claims.

Figure 1:
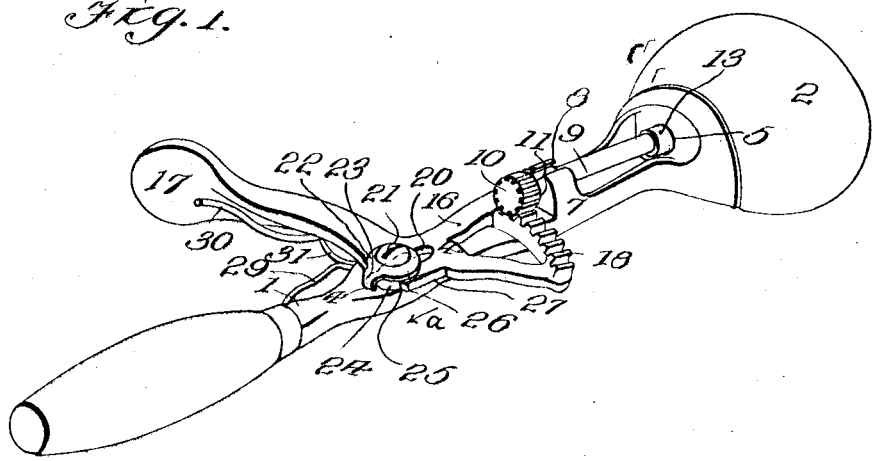
Figure 2:
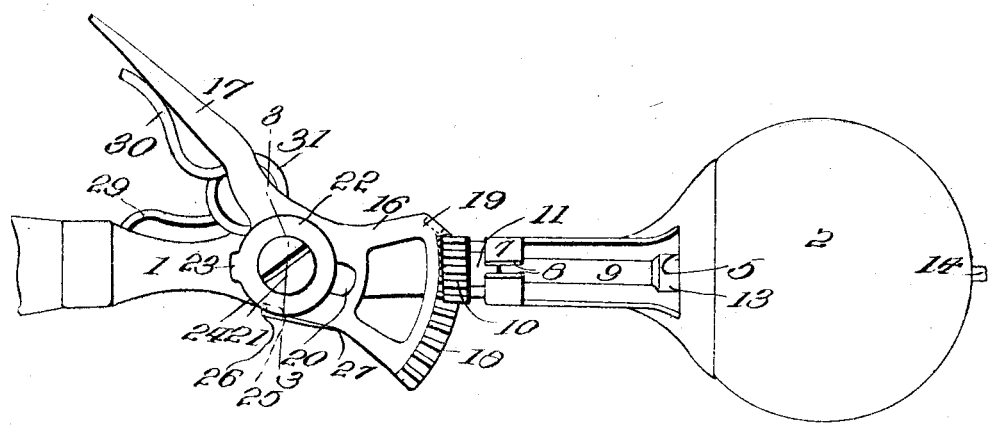
Figure 3:
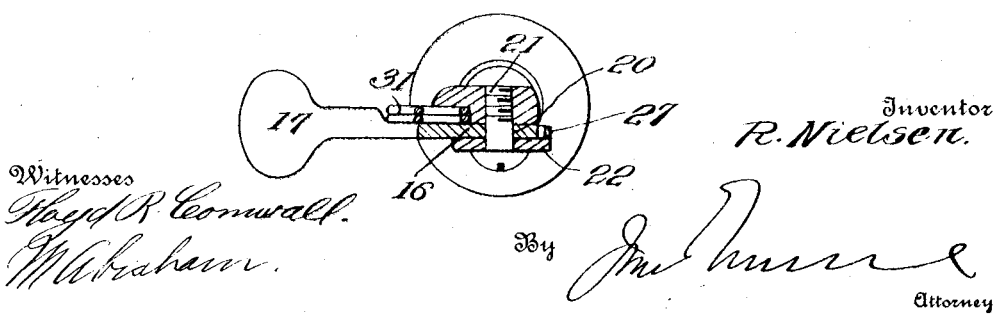

In the drawings: Figure 1 is an inverted perspective view of the preferred embodiment of my invention. Fig. 2 is a bottom plan view of the scraper operating means being disengaged to permit the removal of the scraper. Fig. 3 is a cross section on the line 3—3, Fig. 2. Fig. 4 is a detail transverse section on the line 4—4, Fig. 1. Fig. 5 is a longitudinal section, illustrating the position of the parts to disengage the scraper, and showing the latter dotted preparatory to removing it. Fig. 6, is a perspective view of a modified form of the invention. Fig. 7 is a perspective view of a further modification. Fig. 8 is a similar view, the parts being in position to disengage the finger piece.

1, indicates a handle, provided at one end with a bowl 2, the bowl is formed with an opening forming a bearing 3, and in alinement therewith is a slotted opening forming a bearing 5. The bearing 5, is located at the junction of the handle 1, and the bowl 2, and its upper portion is open as shown at 6. Depending from the handle 1, is a bearing 7, provided in its bottom with a slot 8, of less width than the bearing proper, for a purpose to be described.

9, indicates a shaft having at one end a pinion 10, and adjacent thereto is a hub 11, which is normally seated in the bearing 7. At the opposite end of the shaft is a scraper 12, adjacent the inner end of which is a hub 13, which is normally seated in the bearing 5, while at the outer end of the scraper is a trunnion 14, which operates in the bearing 3.

A finger piece 16, is pivotally secured to the underside of the handle, and has an extension 17, with which the thumb of the operator engages, and at its opposite end is a segmental rack 18, and a limiting lug 19. The finger piece is further provided with an elongated slot 20, through which a screw 21, passes, to form a pivotal connection. Between the finger piece and the head of the screw 21, is interposed a washer 22, formed on its edge with a right angle flange 23. which engages with the circular edge 24, of the finger piece. At the termination of the circular portion 24 of the edge of the finger piece is a notch 25, in which fits the bent end 26, of a spring 27 secured at its opposite end to said finger piece. A spring has one end 29 fastened to the handle, and its opposite end 30 rests against the thumb extension of the finger piece, and intermediate its ends it is coiled as at 31, whereby to normally throw the thumb extension away from the handle, and the limiting lug 19, against the handle.

In operating this form of my invention, the parts are arranged as shown in Fig. 1, wherein the segmental rack is in engagement with the pinion and the angle flange of the extension is adjacent to or in contact with the circular portion 24, of the finger piece, the screw forming the pivot, being against the rear wall of the slot 20 and prevented from becoming displaced by the end 26 of the spring 27. Now to remove the scraper from the bowl, the washer 22 is turned on the screw with sufficient force to cause the angular flange 23 to depress the end 26 of the leaf spring in the notch 25 whereupon the finger piece can be slid rearwardly in direction of the arrow *a*, on the screw to disengage the segmental rack from the pinion. The shaft now being free, it can be turned to bring the scraper in line with the slotted bearing 5, and then by moving the shaft rearwardly the hubs 11 and 13 and the trunnion 14 are forced out of their bearings, and by tilting the shaft, as shown in dotted lines in Fig. 5 the scraper can be readily removed. To assemble the parts again the operation just described is reversed. When using the spoon the stop 19 limits the movement of the finger piece in one direction and the thumb extension 17 contacting with the handle, limits said finger piece in the opposite direction, the spring always returning the parts to normal position.

In Fig. 6, the finger piece is provided with an end notch 35 on the curved edge 24, and in alinement with the elongated slot 20. A lug 36, extends from the handle 1, and engages the curved edge 24 to prevent the finger piece being moved when the parts are assembled for operation. To remove the scraper in this form of the invention, the finger piece is turned to bring the notch 35, in line with the lug 36, and then said finger piece is moved rearwardly, whereupon the scraper and shaft may be removed. In other respects the invention is substantially the same as that previously described.

In Figs. 7 and 8, I have shown a further development of the invention. The finger piece is reversed, that is the segment is in advance of the slot, and the shaft is extended so that the pinion 10 may mesh with said segment. The washer 22, is provided on its upper surface with a slight projection 40, which coöperates with a cotter pin or other like fastening device 41, fitting in an opening in a post 42. When the cotter pin 41 is in position, the projection 40 abuts against it and prevents the washer turning, thereby preventing the finger piece from being moved to disengage the pinion. To remove the finger piece, the cotter pin is slightly withdrawn to permit the projection 40 to pass. When the washer is turned, its flange 23 will be removed from the rounded portion 24, and the finger piece can be moved rearwardly and thereby disengage the pin from the segment.

What I claim is:

1. In an ice cream spoon, the combination of a handle provided with a bowl, a shaft mounted on the handle, a scraper on the shaft, a pinion on the shaft, a finger piece provided with a rack which meshes with the pinion, a journal on which the finger piece is mounted, and means rotatably mounted on the journal for locking the rack and pinion in mesh, said means when removed permitting of the finger piece being moved to disengage the pinion from the rack, whereby the scraper and its shaft may be removed.

2. In an ice cream spoon, the combination of a handle provided with a bowl, a shaft mounted on the handle, a scraper on the shaft, a pinion on the shaft, a finger piece provided with a slot and a rack which meshes with the pinion, a fastening device passing through the slot, means mounted on the fastening device for engaging one edge of the finger piece for retaining the rack and pinion in mesh, said slot permitting of the sliding of the finger piece when the aforesaid means is turned out of the path of the edge whereby to disengage the rack from the pinion to permit the removal of the scraper and its shaft.

3. In an ice cream spoon the combination of a handle and bowl, a shaft provided with a scraper and a pinion, a finger piece formed with a slot and a segmental rack, a fastening device passing through the slot, a device mounted on the fastening device and engaging the outer edge of the finger piece to hold it in position to retain the rack and pinion in mesh, the said device when moved from the engaging position against the edge of the finger piece permitting of the latter being moved to disengage the rack from the pinion.

4. In an ice cream spoon, the combination of a handle and bowl, a finger piece formed with a slot, a fastening device passing through the slot, means engaging the outer edge of the finger piece for retaining the latter in position so that the fastening device will be at or near one end of the slot, said means when removed permitting of the finger piece being moved on the handle to bring the opposite end of the slot adjacent the fastening device, a shaft and scraper, and means between the shaft and finger piece to revolve the former when the slot is located in the first mentioned position.

5. In an ice cream spoon, the combination of a handle and bowl, a scraper and shaft, a pinion on the shaft, a finger piece having a rack which meshes with the pinion, said finger piece having a curved edge, a fastening device passing through the slot, a member mounted on the fastening device and provided with a flange which engages the curved edge to hold the finger piece in position to cause the rack and pinion to mesh, and a device for holding the member in position, said member when moved permitting of movement of the finger piece, whereby the rack will be disengaged from the pinion.

6. In an ice cream spoon the combination of a handle and a bowl, a shaft provided with two hubs, a scraper on the shaft, a pinion on the shaft, a finger piece provided with a rounded edge and having a slot, a rack on the finger piece, said finger piece also having a notch in one edge, a fastening device passing through the slot to hold the finger piece to the handle, a device pivotally mounted on the fastening device and provided with a flange to engage the rounded edge and a leaf spring having an inturned end and secured to the finger piece, the inturned end being normally projected from the edge of the finger piece to hold the device pivoted on the fastening device in relation to the curved edge to hold the rack and pinion in mesh, the slot permitting of the finger piece being moved to disengage the rack from the pinion whereby the scraper may be removed from the bowl.

7. An ice cream spoon comprising a handle, a bowl, a scraper, a shaft extending from the scraper, bearings for the shaft, a pinion on the shaft, a finger piece provided with a rack and a slot, a pin passing through the slot to form a pivot for the finger piece, said finger piece having one of its outer edges curved, the curved edge being normally in alinement with the shaft, a device normally in alinement with the shaft and engaging the curved edge of the finger piece to hold the rack and pinion in mesh, the slot permitting movement of the finger piece to disengage the rack from the pinion for removal of the scraper when the device is turned out of engagement with the edge of the finger piece, and a spring for holding the scraper in normal position in the bowl.

8. An ice cream spoon comprising a handle, a bowl, a scraper, a shaft extending from the scraper, bearings for the shaft, a pinion on the shaft, a finger piece provided with a rack and a slot, a pin passing through the slot to form a pivot for the finger piece, said finger piece having one edge curved, the curved edge being normally in alinement with the shaft, and a device mounted on the pin and provided with a lug which engages the curved edge to normally hold the rack and pinion in mesh, the slot permitting movement of the finger piece to disengage the rack from the pinion for removing the scraper when the lug is removed from the curved edge.

9. An ice cream spoon comprising a handle and a bowl, a longitudinally disposed shaft, a scraper and a pinion secured to the shaft, a finger piece pivotally mounted on the handle and provided with a segmental rack to engage with the pinion there being a slot formed between said finger piece and said handle through which the pivot passes, and a lug formed between the handle and the finger piece to hold the segmental rack on the finger piece in mesh with the pinion, the slot permitting of the withdrawal of the finger piece past the lug to disengage the rack from the pinion.

In testimony whereof I have signed my name to this specification in the presence of two subscribing witnesses.

RASMUS NIELSEN.

Witnesses:
  LEONARD H. GILES,
  NIELS PEDER POULSEN.